US010398003B2

(12) United States Patent
Eddins

(10) Patent No.: US 10,398,003 B2
(45) Date of Patent: Aug. 27, 2019

(54) COLOR-CHANGING LIGHTING DYNAMIC CONTROL

(71) Applicant: Inception Innovations, Inc., Southlake, TX (US)

(72) Inventor: Scott Eddins, Southlake, TX (US)

(73) Assignee: Inception Innovations, Inc., Southlake, TX (US)

( * ) Notice: Subject to any disclaimer, the term of this patent is extended or adjusted under 35 U.S.C. 154(b) by 0 days.

(21) Appl. No.: 15/399,675

(22) Filed: Jan. 5, 2017

(65) Prior Publication Data

US 2017/0238393 A1 Aug. 17, 2017

Related U.S. Application Data

(63) Continuation of application No. 14/787,450, filed as application No. PCT/US2014/026904 on Mar. 14, 2014, now abandoned.

(60) Provisional application No. 61/780,064, filed on Mar. 13, 2013.

(51) Int. Cl.

| | |
|---|---|
| ***B60Q 1/00*** | (2006.01) |
| ***H05B 33/08*** | (2006.01) |
| ***H05B 37/02*** | (2006.01) |
| ***G08B 5/36*** | (2006.01) |

(52) U.S. Cl.

CPC ........... *H05B 33/0872* (2013.01); *G08B 5/36* (2013.01); *H05B 33/0845* (2013.01); *H05B 37/0245* (2013.01); *H05B 37/0254* (2013.01); *H05B 37/0272* (2013.01)

(58) Field of Classification Search

None

See application file for complete search history.

(56) References Cited

U.S. PATENT DOCUMENTS

| | | | | |
|---|---|---|---|---|
| 6,564,108 | B1 | 5/2003 | Makar et al. | |
| 7,529,351 | B2 * | 5/2009 | Binning | H04L 12/66 379/45 |
| 8,438,210 | B2 | 5/2013 | Poder et al. | |
| 8,520,068 | B2 | 8/2013 | Naidoo et al. | |
| 2006/0076908 | A1 | 4/2006 | Morgan et al. | |
| 2008/0118039 | A1 | 5/2008 | Elliot et al. | |
| 2010/0188023 | A1 * | 7/2010 | Anderson | F21S 8/032 315/312 |
| 2010/0213876 | A1 | 8/2010 | Adamson et al. | |
| 2011/0084616 | A1 * | 4/2011 | Negley | H05B 33/0884 315/154 |
| 2011/0121734 | A1 * | 5/2011 | Pape | F21V 25/12 315/86 |

(Continued)

FOREIGN PATENT DOCUMENTS

| | | |
|---|---|---|
| EP | 2605622 | 7/2013 |
| KR | 1020080060603 | 7/2008 |
| WO | 2003026305 A1 | 3/2003 |

OTHER PUBLICATIONS

International Search Report and Written Opinion, PCT/US2014/026904, dated Aug. 28, 2014, 7 pages.

*Primary Examiner* — Julie B Lieu

(74) *Attorney, Agent, or Firm* — Peter V. Schroeder

(57) ABSTRACT

A control gateway for colored or color-changing lighting fixtures to allow access to local and remote control systems with real time control with power backup for security triggering using an established color code to indicate the nature of the emergency.

25 Claims, 10 Drawing Sheets

(56) References Cited

U.S. PATENT DOCUMENTS

| | | | | |
|---|---|---|---|---|
| 2011/0215725 | A1 | 9/2011 | Paolini | |
| 2012/0098439 | A1* | 4/2012 | Recker | H05B 33/0815 315/152 |
| 2014/0084165 | A1* | 3/2014 | Fadell | G08B 17/00 250/340 |
| 2014/0312802 | A1* | 10/2014 | Recker | H02J 9/02 315/291 |
| 2014/0361688 | A1* | 12/2014 | Recker | H02J 9/02 315/86 |
| 2015/0021990 | A1* | 1/2015 | Myer | F21S 2/00 307/23 |
| 2015/0055959 | A1* | 2/2015 | Pederson | H04B 10/1143 398/130 |
| 2015/0097666 | A1* | 4/2015 | Boyd | G01N 27/02 340/517 |
| 2015/0163867 | A1* | 6/2015 | Recker | H02J 9/02 315/250 |
| 2016/0105943 | A1* | 4/2016 | Recker | H05B 33/0803 315/152 |
| 2016/0165694 | A1* | 6/2016 | Pederson | H05B 33/0842 315/131 |

* cited by examiner

COLOR-CHANGING LIGHTING DYNAMIC CONTROL

CROSS-REFERENCE TO RELATED APPLICATIONS

This is a PCT Application claiming priority to U.S. Provisional Application No. 61/780,064, filed Mar. 13, 2013.

FIELD OF INVENTION

The present invention is in the technical field of lighting control. More particularly, the present invention is in the technical field of security product integration. More particularly, the disclosure relates to computer systems and methods for managed control of lighting systems.

BACKGROUND

Residences and businesses are using colored, color changing, and mode changing lighting more often. It is desirable or necessary to control such lighting to create "scenes" (e.g., for holidays), create aesthetically appealing lighting, etc. However, creating, storing, and applying such specialized lighting control can be time intensive and expensive. Further, it is typical for residences and businesses to have security systems for alerting emergency personnel to an emergency situation or requesting emergency services (e.g., police, fire department, etc.). Often such systems communicate directly with a third party monitoring service which, in turn, communicates with 9-1-1 services. Security systems often include control of local audio devices (e.g., sirens) and lighting devices (e.g., strobe lights) as well as communication devices.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION

Figure 1:
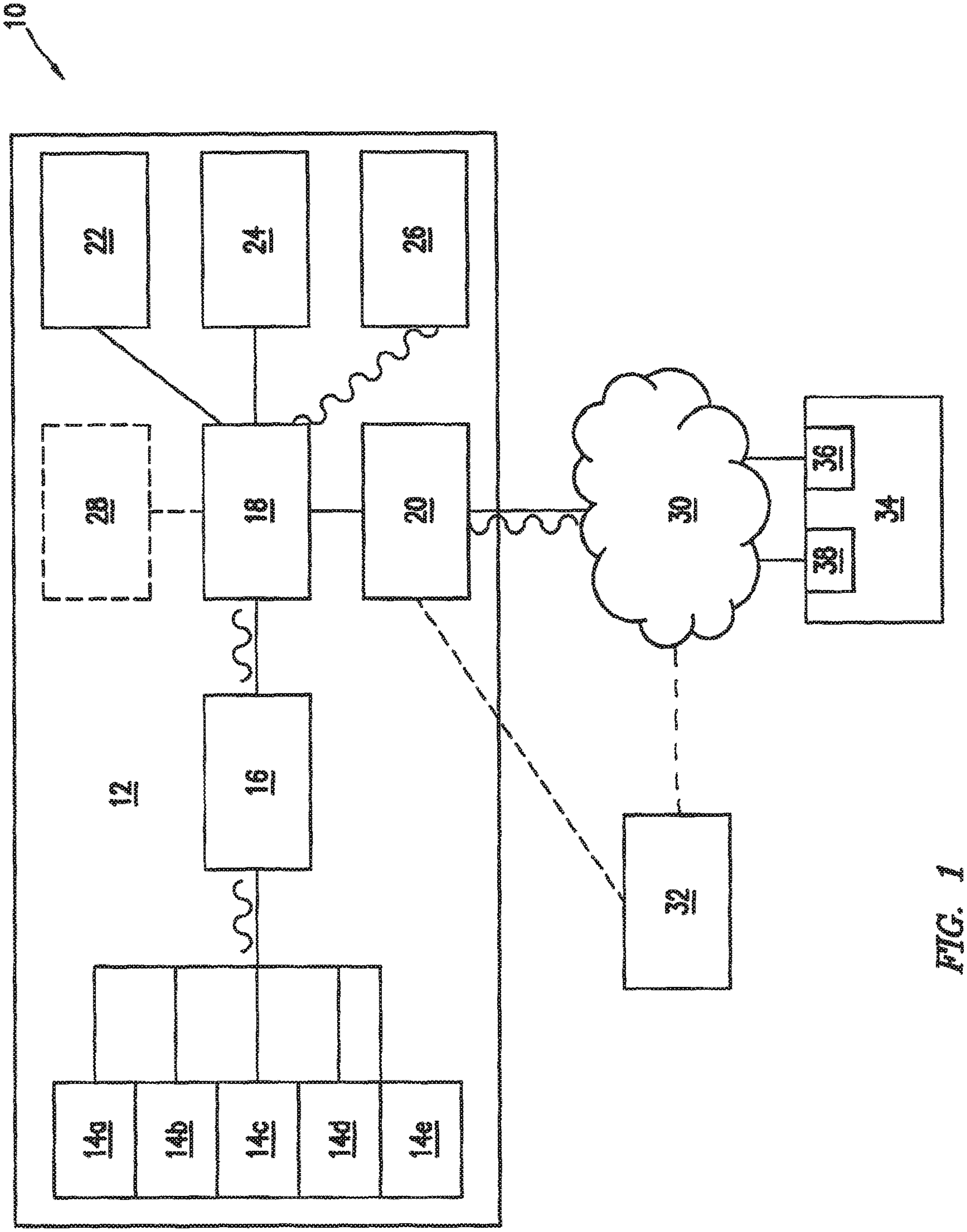
FIG. 1 is a schematic of an exemplary computerized architecture according to an aspect of the invention.

The present inventions and disclosures are described by reference to drawings showing one or more examples of how the inventions can be made and used. In these drawings, reference characters are used throughout the several views to indicate like or corresponding parts. In the description which follows, like or corresponding parts are marked throughout the specification and drawings with the same reference numerals, respectively. The drawings are not to scale and proportions of certain parts have been exaggerated to better illustrate details and features.

Definitions

Computer/Computerized System

The system, methods, and other embodiments according to the present disclosure include computerized systems requiring the performance of one or more methods or steps performed on or in association with one or more computer.

A computer is a programmable machine having two principal characteristics, namely, it responds to a set of instructions in a well-defined manner and can execute a pre-recorded list of instructions (e.g., a program). A computer according to the present disclosure is a device with a processor and a memory. For purposes of this disclosure, a computer includes a server, a personal computer, (i.e., desktop computer, laptop computer, netbook), a mobile communications device, such as a mobile "smart" phone, and devices providing functionality through internal components or connection to an external computer, server, or global communications network (such as the internet) to take direction from or engage in processes which are then delivered to other system components.

Those of skill in the art recognize that other devices, alone or in conjunction with an architecture associated with a system, can provide a computerized environment for carrying out the methods disclosed herein. The method aspects of the disclosure are computer implemented and, more particularly, at least one step is carried out using a computer.

General-purpose computers include hardware components. A memory or memory device enables a computer to store data and programs. Common storage devices include disk drives, tape drives, thumb drives, and others known in the art. An input device can be a keyboard, mouse, hand-held controller, remote controller, a touchscreen, and other input devices known in the art. The input device is the conduit through which data and instructions enter a computer. An output device is a display screen, printer, or other device letting the user sense what the computer has accomplished, is accomplishing, or is expected to accomplish. A central processing unit (CPU) is the "brains" of the computer and executes instructions and performs calculations. For example, typical components of a CPU are an arithmetic logic unit (ALU), which performs arithmetic and logical operations and a control unit (CU) which extracts instructions from memory, decodes and executes them, calling on the ALU when necessary. The CPU can be a micro-processor, processor, one or more printed circuit boards (PCBs). In addition to these components, others make it possible for computer components to work together or in conjunction with external devices and systems, for example, a bus to transmit data within the computer, ports for connectivity to external devices or data transmission systems (such as the internet), wireless transmitters, read and read-write devices, etc., such as are known in the art.

Server

A server is a computer or device on a network that manages network resources. There are many different types of servers, including remote, live and network access servers, data servers, member servers, staging servers, etc. A server can be hardware and/or software that manages access to a centralized resource or service in a network. For purposes of this disclosure, the term "server" also includes "virtual servers" which can be hosted on actual servers.

Network

A computer network or data network is a communications network allowing computers to exchange data, with networked devices passing data to each other on data connections. Network devices that originate, route, and terminate data are called nodes. The connections (links) between nodes are established using wire or wireless media. Nodes can include hosts, such as PCs, phones, servers, and networking hardware. Devices are networked together when one device is able to exchange information with the other device whether or not they have a direct connection to each other. Computer networks support applications such as access to the World Wide Web (WWW) or internet, shared use of application and storage servers, printers, and use of email and instant messaging applications. Computer networks differ in the physical media to transmit signals, protocols to organize network traffic, network size, topology, and organizational intent.

Gateway

A (control) gateway is a network node that acts as an entrance to another network. In homes, the gateway is the ISP (internet service provider) that connects the user to the internet. In enterprises, the gateway node often acts as proxy server and firewall. The gateway is also associated with a router, which uses headers and forwarding tables to determine where packets are sent, and a switch, which provides the actual path for the packet in and out of the gateway.

A (control) gateway for the particular purpose of connection to identified cloud storage, often called a cloud storage gateway, is a hardware-based and/or software-based appliance located on the customer premises that serves as a bridge between local applications and remote cloud-based storage and are sometimes called cloud storage appliances or controllers. A cloud storage gateway provides protocol translation and connectivity to allow incompatible technologies to communicate transparently. The gateway can make cloud storage appear to be an NAS (network attached storage) filer, a block storage array, a backup target, a server, or an extension of the application itself. Local storage can be used as a cache for improved performance. Cloud gateway product features include encryption technology to safeguard data, compression, de-duplication, WAN optimization for faster performance, snapshots, version control, and data protection.

Bridge

A "bridge" connects two (local) networks, often connecting a local network using an internet router.

Router

A router forwards data packets along networks and is connected to at least two networks, commonly two LANs, WANs, or a LAN and its ISP's network. Routers are located at "gateways," the places where two or more networks connect. Routers use headers and forwarding tables to determine paths for forwarding packets and use protocols to communicate with each other to configure a route between hosts.

Database

The disclosure includes one or more databases for storing information relating to aspects of the disclosure. The information stored on a database can, for example, be related to a private subscriber, a content provider, a host, a security provider, etc. One of ordinary skill in the art appreciates that "a database" can be a plurality of databases, each of which can be linked to one another, accessible by a user via a user interface, stored on a computer readable medium or a memory of a computer (e.g., PC, server, etc.), and accessed by users via global communications networks (e.g., the internet) which may be linked using satellites, wired technologies, or wireless technologies.

The Cloud/Cloud Computing/SaaS

In computer networking, "cloud computing" is used to describe a variety of concepts involving a large number of computers connected through a network (e.g., the Internet). The phrase is often used in reference to network-based services, which appear to be provided by real server hardware, but which are in fact served by virtual hardware, simulated by software running on one or more machines. Virtual servers do not physically exist and can therefore be moved around, scaled up or down, etc., without affecting the user.

In common usage, "the cloud" is essentially a metaphor for the internet. "In the cloud" also refers to software, platforms, and infrastructure sold "as a service" (i.e., remotely through the internet). The supplier has actual servers which host products and services from a remote location, so that individual users do not require servers of their own. End-users can simply log-on to the network, often without installing anything, and access software, platforms, etc. Models of cloud computing service are known as software as a service, platform as a service, and infrastructure as a service. Cloud services may be offered in a public, private, or hybrid networks. Google, Amazon, Oracle Cloud, and Microsoft Azure are well-known cloud vendors.

Software as a service (SaaS) is a software delivery model in which software and associated data are centrally hosted on the Cloud. Under SaaS, a software provider licenses a software application to clients for use as a service on demand, e.g., through a subscription, time subscription, etc. SaaS allows the provider to develop, host, and operate a software application for use by clients who just need a computer with internet access to download and run the software application and/or to access a host to run the software application. The software application can be licensed to a single user or a group of users, and each user may have many clients and/or client sessions.

Typically, SaaS systems are hosted in datacenters whose infrastructure provides a set of resources and application services to a set of multiple tenants. A "tenant" can refer to a distinct user or group of users having a service contract with the provider to support a specific service. Most SaaS solutions use a multi-tenant architecture where a single version of the application, having a single configuration (i.e., hardware, operating system, and network) is used by all tenants (customers). The application can be scaled by installation on several machines. Other solutions can be used, such as virtualization, to manage large numbers of customers. SaaS supports customization in that the application provides defined configuration options allowing each customer to alter their configuration parameters and options to choose functionality and "look and feel."

SaaS services are supplied by independent software vendors (ISVs) or Application Service Providers (ASPs). SaaS is a common delivery model for business applications (e.g., office and messaging, management, and development software, and for accounting, collaboration, management information systems (MIS), invoicing, and content management.

SaaS is an advantage to end-users in that they do not need to provide hardware and software to store, back-up, manage, update, and execute the provided software. Since SaaS applications cannot access the user's private systems (databases), they often offer integration protocols and application programming interfaces (API) such as http (hypertext transfer protocol), REST (representational state transfer), SOAP (simple object access protocol), and JSON (JavaScript Object Notation).

FIG. 1

FIG. 1 is a schematic of an exemplary computerized architecture according to an aspect of the invention. A premises 10, such as a house, business, etc., has a remote private network 12. The network 12 will be referred to herein as a "private" network to distinguish it from the internet and other "public" networks, although the private network can have multiple authorized users. A "user" can be multi-tenant or have multiple buildings/systems controlled on one user account. Further, to indicate its installation and maintenance independent of the provider and administrator networks, the network 12 is referred to as "remote." The remote private network can also be thought of and referred to as a user network.

The remote private network 12 can have multiple components, including hardware, software, appliances, etc. The illustrated private network includes color-changing lights 14, a color-changing light controller 16, a purpose-specific control gateway 18, an IP addressable router 20, a personal computer 22, laptop or notebook 24, and a mobile phone (or other mobile device) 26. The private network need not include all these exemplary devices and can include additional or substitute devices. Communication between the components of the private network is by wire (solid lines) or wireless (wavy lines). Communication can be by wire, wireless, infrared, radio frequency, Ethernet, or any other technology known or later developed regardless of the wired-wireless indications on the Figures and herein.

The remote private network 12 can also include and be connected to a security system 28 which may have its own network components such as alarm sirens, sensors (audio, motion, magnetic, etc.), back-up power systems, and communications systems with a security monitoring company, etc. The security system can also interface directly with the components of the remote private network 12, such as the personal computer 22, mobile device 26, light controller 16, etc.

The color-changing lights or light fixtures 14*a-e* are capable of emitting light of more than one color. Exemplary color-changing lights are RGB LEDs, bi-color LEDs, flashing LEDs, digital RGB LEDs, (organic) OLEDs, RGB WLEDs (White LEDs), di-, tri-, and tetra-chromatic white LEDs, and phosphor-based LEDs. Color-changing light fixtures utilize such color-changing lights, with individual lights controlled either individually or as a group. Exemplary lighting fixtures include, but are not limited to, light strips, light clusters, flexible media lighting, recessed lighting (cans, coves, torches, troffers, etc.), surface mounted lighting (chandeliers, pendants, sconces, track lighting, sign lighting, strip lights, etc.), forward and rear facing lighting, broad and narrow floodlights, floor lights, aisle lights, outdoor, landscape and sport lighting (mast, bollard, yard, etc.), and special-purpose lighting (accent, background, blacklight, strobe, etc.). The lights or light fixtures can be wired, as with traditional lighting, or wireless. For example, wireless LED light strips are available having the necessary hardware and/or software to communicate with a controller wirelessly. Further, individual LED lights, for use in traditional sockets, are available with their own attached IP-addressable chips or wireless controls. Wireless lights and fixtures can be operated by radio frequency (RF), infrared (IR), or any other remote communications now known or later available. Digital RGB LEDs contain "smart" control electronics providing connections for data-in, data-out, a clock, and/or strobe signal, etc. These digital RGB LEDs can be connected in a "daisy chain" with the data-in of the first LED sourced by a microprocessor which can control the brightness, color, etc., of each LED independently. Such digital RGB LEDs are commercially available, for example, using chips designated WS2811 and WS2812. The color-changing lights or fixtures can further be grouped and controlled as a group. For example, multiple lights can be designated as "living room," "theater," "party setting," or "emergency setting" lights. Groups can overlap. For example, the designated emergency lights can be all the lights in the house set to their brightest white, including the living room lights.

The plurality of color-changing lights or light fixtures 14*a-e* are connected to and controlled by a color-changing light controller 16. Such controllers are commercially available, such as HDE (tradename) "Magic Lighting" remote control (RC), Pentair's Intellibrite (tradename) controller, Armacost Lighting (tradename), etc., or can be provided specifically with the disclosed apparatus and services. The controller can provide control of light intensity, light color, color-change sequence, color selection, color-change transition effects (fast fade, slow fade, etc.), color-change duration or speed, on/off, and/or flashing or strobe effects. Other control features will be apparent to those of skill in the art.

The router 20 provides connectivity with the internet 30, by wire or wirelessly. The internet, World Wide Web, and cloud are understood by those of skill in the art and are terms of art, and will not be described in detail herein.

The gateway 18 provides connectivity, via the internet, to a purposed content server 34. The gateway 18 can be a stand-alone appliance, such as a hand-held or wall-mounted controller, or can be an application or software supplied and accessible from another computer, such as personal computer 22, mobile device 26, notebook 24, etc. The gateway can have the "look and feel" of an application, web page, browser, server interface, etc. The gateway can be operated or controlled by gateway software providing computer executable instructions to the hosting computer or network that, when executed, connects a computer of the remote private network to the content server. Initially and periodically, gateway software can be uploaded to the private network.

The content server 34 can be an actual or virtual server, multiple servers, and can include further hardware, software, and networked devices. The content server 34 can be partitioned, aggregated, etc., as is known in the art. The content server includes both stored data and programs, such as provider content or gateway software, and serves as a content administrator for controlling access to and transmission of data from the content server. The content server is web-hosted or internet-hosted and accessed via the internet. The content server can be connected to or accessed through a web page, via an internet browser or application, etc.

A remote provider network 32 has connectivity to the content server 34, again, via the internet. The provider network can include servers (actual or virtual), and other hardware and software, as well as other network devices. The remote provider network is independent from the content server 34 and the private network 12. The remote provider network stores and manages provider color-changing light content, such as software programs for controlling color-changing lights or controllers. The lighting control content made available by the provider network can be lighting control software, lighting control streaming content, calendaring software or data, lighting control or controller activation software or data, use-management software or data, interface or protocol software, software or data for synchronization of lighting control to a real-time event (e.g., a sporting event, game, awards show, etc.), software or data for synchronization of lighting control to specified audio or audio-visual content (e.g., a movie, song, etc.), software for controlling lighting in response to sensed audio, visual, or audio-visual stimuli (e.g., as sensed by on-location sensors, etc.), subscription software or data, software or data for control of security or emergency lighting, and any combination thereof. The lighting control content transmitted from the content server to the remote private network, upon execution, controls a color-changing light controller or color-changing lights located on the remote private network 12 or premises 10.

The content server 34 transmits (e.g., pushes, uploads, etc.) color-changing lighting control content to the user or private network. (Conversely, the private network downloads or pulls content from the server.) Similarly, the provider network 32 transmits color-changing lighting control content to the content server 34. (Conversely, the content server downloads or pulls content from the provider network.)

The content server 34 acts as an administrator by controlling who accesses the server, what content is available to the accessing party, what can be downloaded or uploaded to the server, etc. The content serve stores, accesses, controls, monitors, and tracks content, and can provide accounting, logging, and other management functions. The content server can also be employed to maintain individual user accounts 36, for example, on a user account server, corresponding to a user's remote private network. The user account server can be real or virtual and can reside on or be controlled by the content server. Similarly, the content server can be employed to maintain individual provider accounts 38, for example, on a provider account server, corresponding to a plurality of remote provider networks. The provider account server can be real or virtual and can reside on or be controlled by the content server.

The content server 34 or associated servers (e.g., user account server, provider account server) administer access by a user of a remote private network to lighting control content on the lighting control server. For example, such administration can include identifying and verifying the user of a remote private or provider network before allowing access to the content server. Identification and verification can include cross-indexing IP addresses, requiring user name and password, etc., as is known in the art.

Further, administration can include collecting individual user data corresponding to a remote private network. Administering access by a user of a remote private network can include collecting, storing, and associating user data with the corresponding user account. Individual user data can include user name, user password, user IP address, user physical address, lighting controller data, lighting fixture data, lighting location data, lighting grouping data, lighting color data, calendaring data, security system data, subscription data, or permissions for real-time lighting control by a subscription or security administrator. User data can also include selection of lighting control content; selection of subscription services for lighting control content; selection of authorized administrators having access to the user's private network; selection of times authorized administrators have access to the user's private network; selection of events when lighting control is desired (e.g., weather service warnings); calendaring of events when lighting control is desired (e.g., game days); calendaring and indication of times when the user is absent or present on the premises; identification and information relating to the user's color-changing lighting system; identification of the number, type, specifications, and location of lighting sources installed at the user's premises; designation of light sources or locations for a specific purpose (e.g., theater lighting); and any combination thereof.

The content server can also, in one embodiment, connect to the remote private network and control the color-changing light system in response to occurrence of: a selected event, a calendared event, an event related to a selected subscription, or an event identified by a subscription provider. Alternately, the content server can control the color-changing system in real time in response to real time events (e.g., weather warning, touchdown). The content transmitted to the remote private network can be executable software to control the color-changing light system upon occurrence of an event (e.g., alarm, start of movie), or calendared event.

The content server and administrator can also administer transmission of lighting control content from a remote provider network directly to a remote private network, as indicated by the dashed line in FIG. 1, including identifying and verifying the remote provider network and the remote private network, and transmitting data regarding the verification to at least one of the remote provider network and remote private network.

Figure 2:
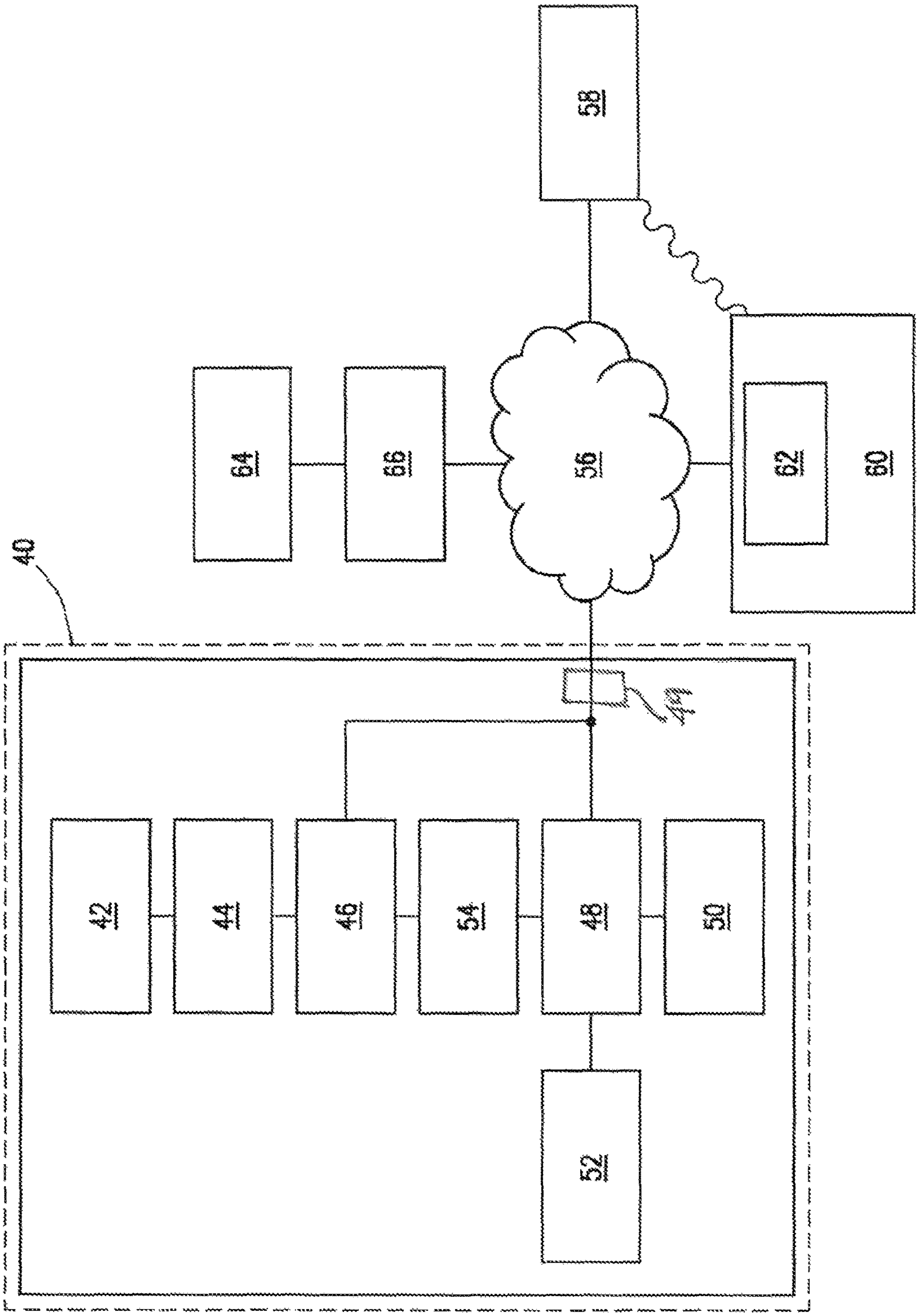
FIG. 2 is a schematic of an exemplary computerized architecture according to an aspect of the disclosure.

FIG. 2 is a schematic of an exemplary computerized architecture according to an aspect of the invention. FIG. 2 is similar to FIG. 1 and will not be described in detail to avoid redundancy.

FIG. 2 illustrates a system for providing color-changing light control at a premises as part of a security or Enhanced 9-1-1 system. The premises 40 includes color-changing lights 42, a color-changing light controller 44, a gateway 46, and a router 49 as well as a computerized security system 48 having its own security network including items such as security input devices 50 (e.g., motion sensors, magnetic sensors for indicating whether doors or windows are open or closed, audio sensors such as those that detect breaking glass, smoke and gas detectors, etc.). The security network also can include output devices 52 (e.g., sirens, strobe lights, automatically locking doors, etc.).

In one embodiment, the security system 48 and gateway 46 or controller 44 communicate directly, sharing a protocol or using an application programming interface (API) 54. Alternately, the security system and light control gateway or controller can be part and parcel of the same system, commonly controlled and monitored.

The security system and/or the gateway have connectivity to the internet 56. The security system and/or light control system are monitored by a security monitoring company (e.g., ADT (trade name)) having its own network or server 58 connectable to the internet. The monitoring company communicates with the 9-1-1 or Enhanced 9-1-1 network 60, typically through a Public Safety Answering Point (PSAP) 62. This communication can be via telephone, internet, or other communications system.

The content server 64 is again connectable to the internet 56. The content server 64 can identify and verify 66 the security system or private network sending an alarm or other communication signal. The content server can also communicate with the monitoring server 58 and/or 9-1-1 system 60. The content server can, upon a signal from the gateway, the security system, the monitoring network or the Enhanced 9-1-1 network, activate and control the color-changing lights at the private network premises 40. Similarly, the monitoring server 58 can activate and control the color-changing lights. Similarly, the Enhanced 9-1-1 system can directly activate and control the color-changing lights.

Figure 3:
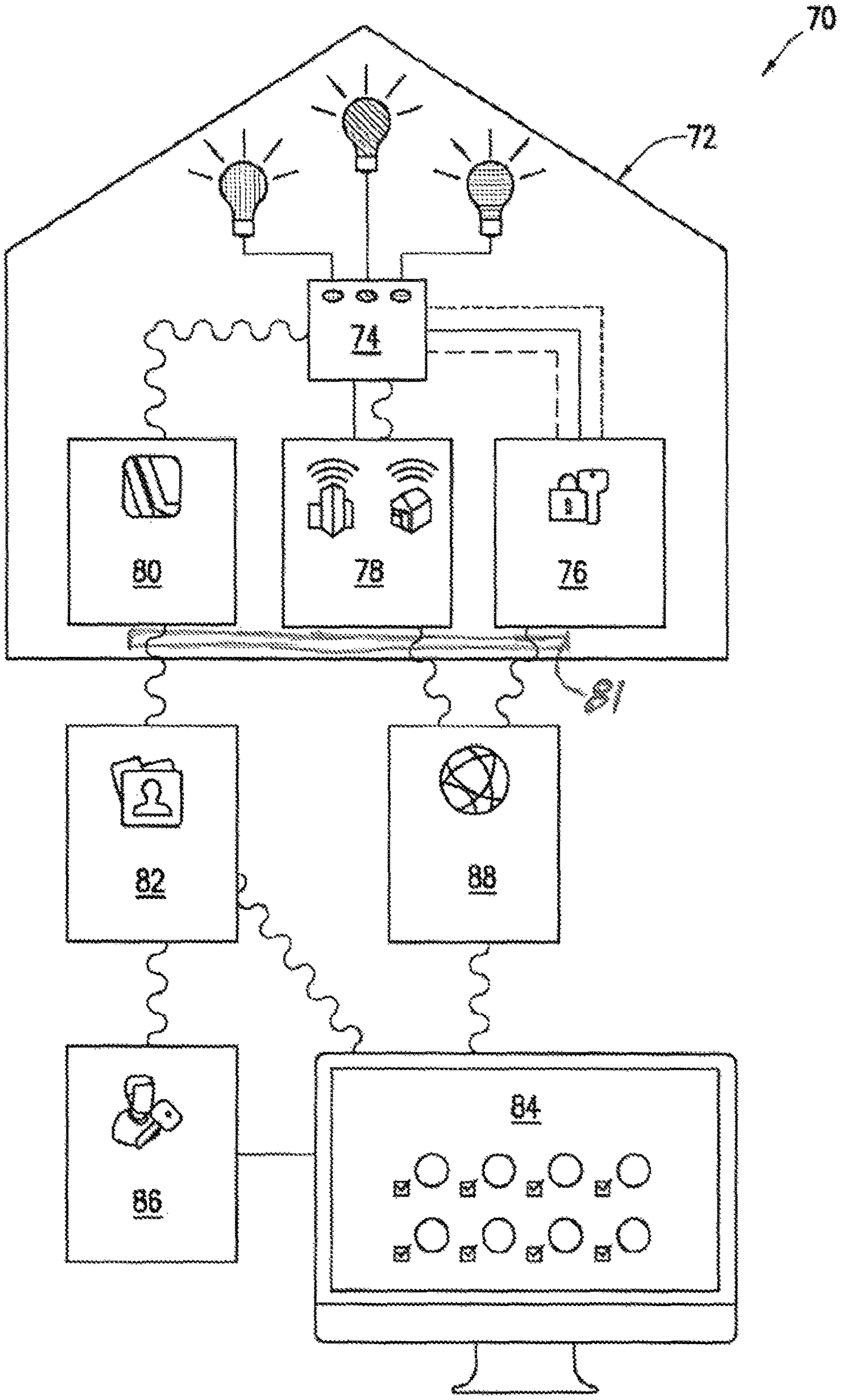
FIG. 3 is a schematic of an exemplary computerized architecture of according to one embodiment of the disclosure.

FIG. 3 is a schematic of an exemplary computerized architecture according to one embodiment of the invention. FIG. 3 shows a premises 70 having a private network 72 including a color-changing light controller 74, a security system 76, an automation system 78, gateway 80, and router 81 connectable to the internet. A customer or user account 82 is maintained on a server off-site. The user account is used to access available color-changing light content such as subscriptions, software, programs, etc. The content database 84 is administered by an administrator 86. A licensed or authorized content provider 88 also has, via the internet, access to the database 84, security system 76, and/or automation system 78.

The automation system 78 can be an automation system provided by a third party such as a cable provider, a home automation services provider, etc. That is, if the user purchases content to synchronize with or play concurrently with a movie ordered through the cable company, the cable company (as an authorized provider) can supply the lighting control content alongside, in conjunction with, or in addition to the movie content. Other example will be apparent to those of skill in the art. In such a case, the gateway 80 can also be provided and controlled by the third party content provider. That is, the gateway can be part of the gateway provided by the cable company, accessible on the television or other computer. In this instance, the third party provider 88 has access to the available content on the database 84.

Figure 4:
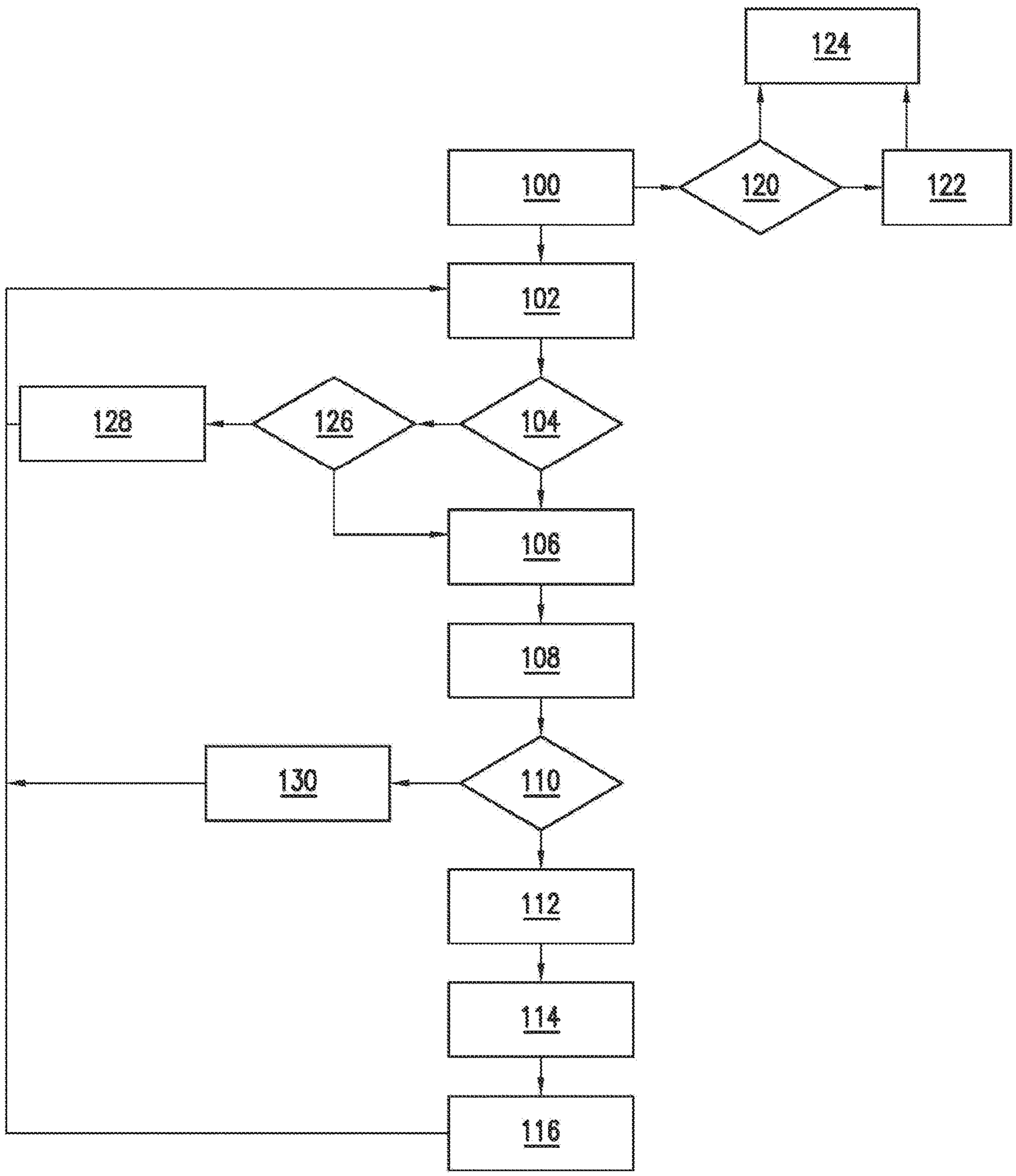
FIG. 4 is a flow chart for program activation in according to an aspect of the disclosure.

FIG. 4 is a flow chart according to an aspect of the invention. FIG. 4 provides a flow chart, algorithm, or decision tree for when a software program, whether resident on the private network, provider network, or content server, receives a "trigger" from a calendared event or a manually entered trigger 100 (e.g., a user on the internet requesting a download or subscription service, etc.). The request is received by the gateway 102. The gateway can be resident on any of the private network nodes. The gateway determines whether the requested content requires real time administration at point 104. For example, content requiring real time administration includes subscriptions for real time control of color-changing lighting in response to an occurring event such as a football game, an awards show, etc. The administrator must provide real time instruction to the gateway and controller. Content not requiring real time administration includes content controlling lighting for holidays, on-demand, for synchronization with a movie or music, etc.

If real time administration is required, the private network is connected to the content server at 106, which administers access 108 such as identifying and verifying the accessing network or user, confirming a subscription purchase, etc. The content server and administrator may then also query whether the requested content requires real time monitoring or administration at 110. If not, the requested content can be uploaded or streamed 130 to the private network. If so, a connection 112 is made to the real time administrator (e.g., a subscription provider providing real time lighting control in response to real time events (game, show, etc.)). The subscription provider may also require or be required to log in, verify identity, etc., at 114, before beginning to stream or transmit 116 content (e.g., lighting control data, software, etc.) to the private network 102. The private network 102 can query 120 which home appliances or network nodes must be used to activate the content and whether multiple devices or nodes must synchronize the lighting content with other content (e.g., a movie). If so, the synchronization is done at 122 and the content is activated or run at 124. Where real time monitoring is not required, the private network can query the location of the lighting content (e.g., locally stored or at the content server) at 126. If stored off-site, the private network connects to the content server. If locally stored, the private network executes the program or runs the content at 128.

Figure 5:
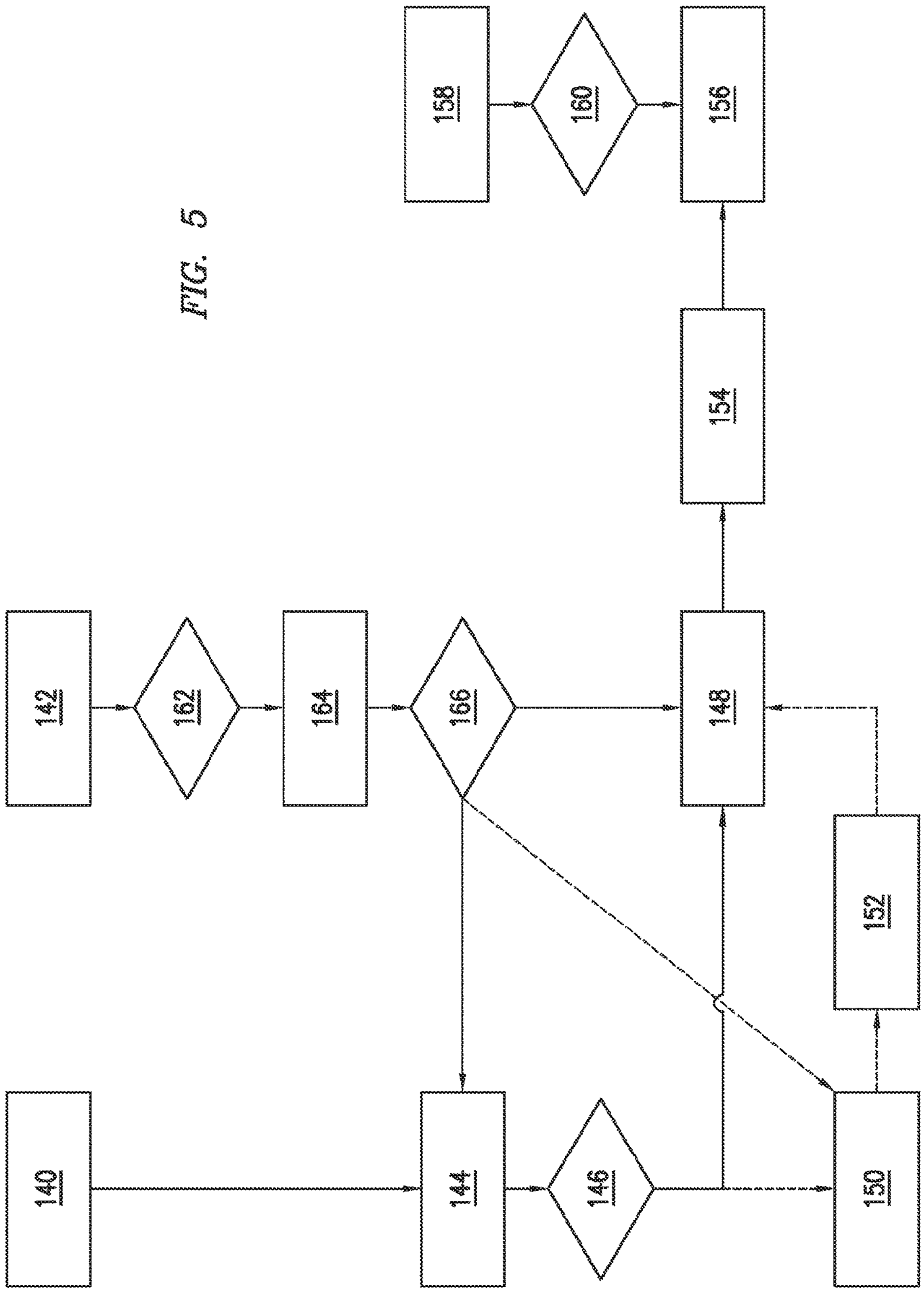
FIG. 5 is a flow chart for security activation in according to an aspect of the disclosure.

FIG. 5 is a flow chart according to an aspect of the invention. Here the trigger is a phone alarm 140 or home alarm 142. The phone alarm is a direct call from a user (or third-party) to the 9-1-1 system 144, in which case 9-1-1 checks, preferably automatically, to see if the premises network is a subscriber to color lighting control keyed to Enhanced 9-1-1 at 146, and then operate the controlled lighting directly at 148 or indirectly through the content server 150 and its connection 152 to the private network 154. The private network 154 operates the color-changing lights 156. A manual override 158 can countermand any such control. A verification 160 of the manual override can be required as well (e.g., phone call, password, etc.). Similarly, the home alarm 142 can determine whether the alarm was triggered automatically or manually, and whether a particular indication of the type of emergency (e.g., fire, intruder, general, etc.) was made 162. This information can be transmitted to a monitoring service 164. The provider checks to see if the security user also has a color-changing light control subscription and capabilities 166 and provides the information to Enhanced 9-1-1 144 (or, alternately, to the content server 150).

Figure 6:
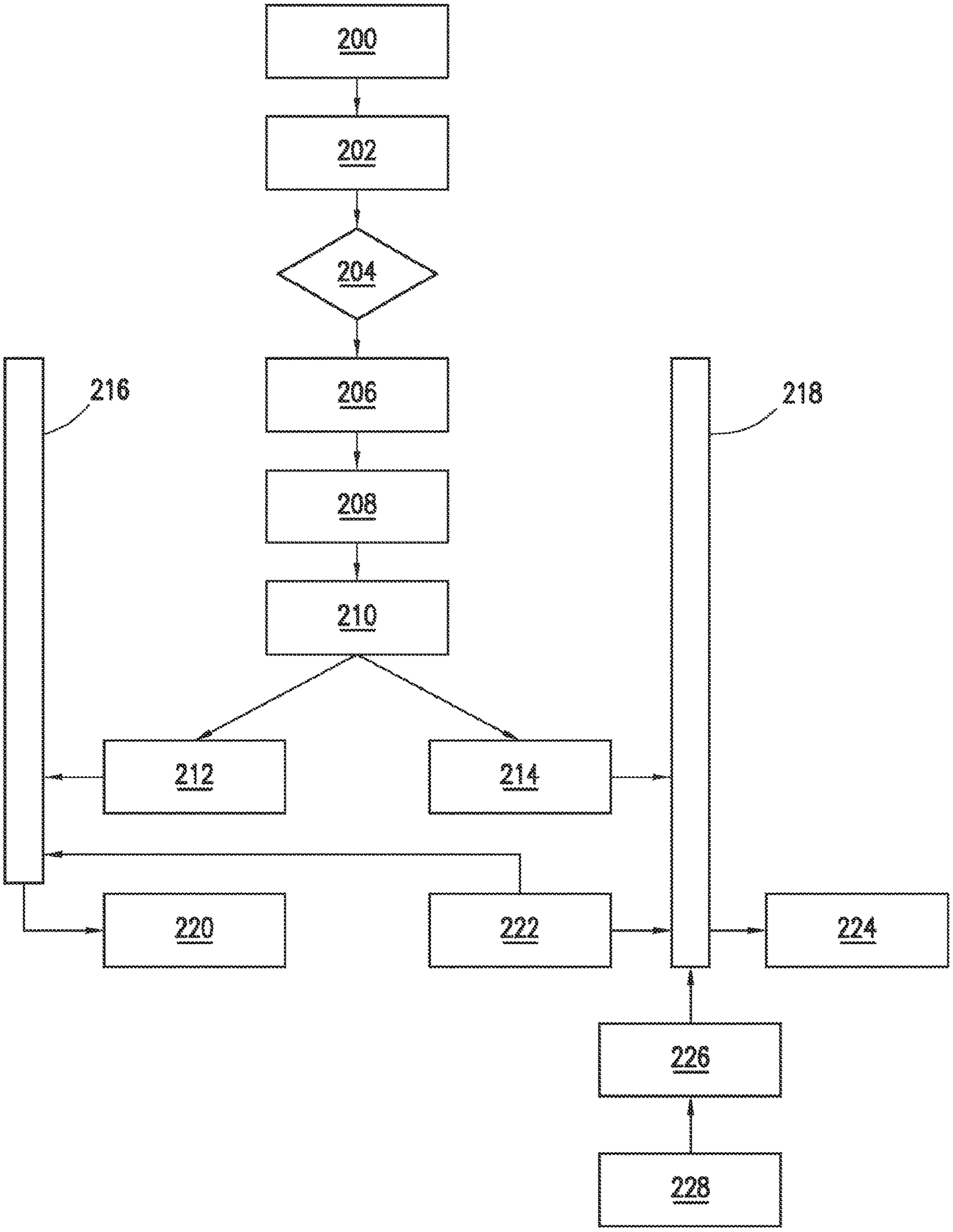
FIG. 6 is a priority access flow chart in according to an aspect of the disclosure.

FIG. 6 is a flow chart according to an aspect of the invention. Where multiple parties have access or can gain access to the color-changing light control system or private network, there is a chance for conflicting instructions and control. A priority flow chart is seen in FIG. 6 where a request 200 to control the lights is received. The system, typically at the private network, queries and identifies 202 the requestor, and can collect other information such as what systems are to be controlled, for what purpose, by whom, when, etc. If the requestor is verified 204 as an authorized provider or controller, the system determines whether the effected lights are already in use 206, by whom 208, and applies a hierarchy 210 to determine what party receives control of the lights. If the requestor is of a higher priority level 214, the requestor is allowed or granted control of the lights or system. If not 212, the request is denied 216. Where a request is denied 216, the system can send a query 220 to the user indicating they can select 222 which requestor gains access 218 to the light controls. Again, a manual override 228 and verification of the override 226 can be used as well. At 224 the system reverts to the original "current" controller after an ok or yes from the user at step 222.

Figure 7:
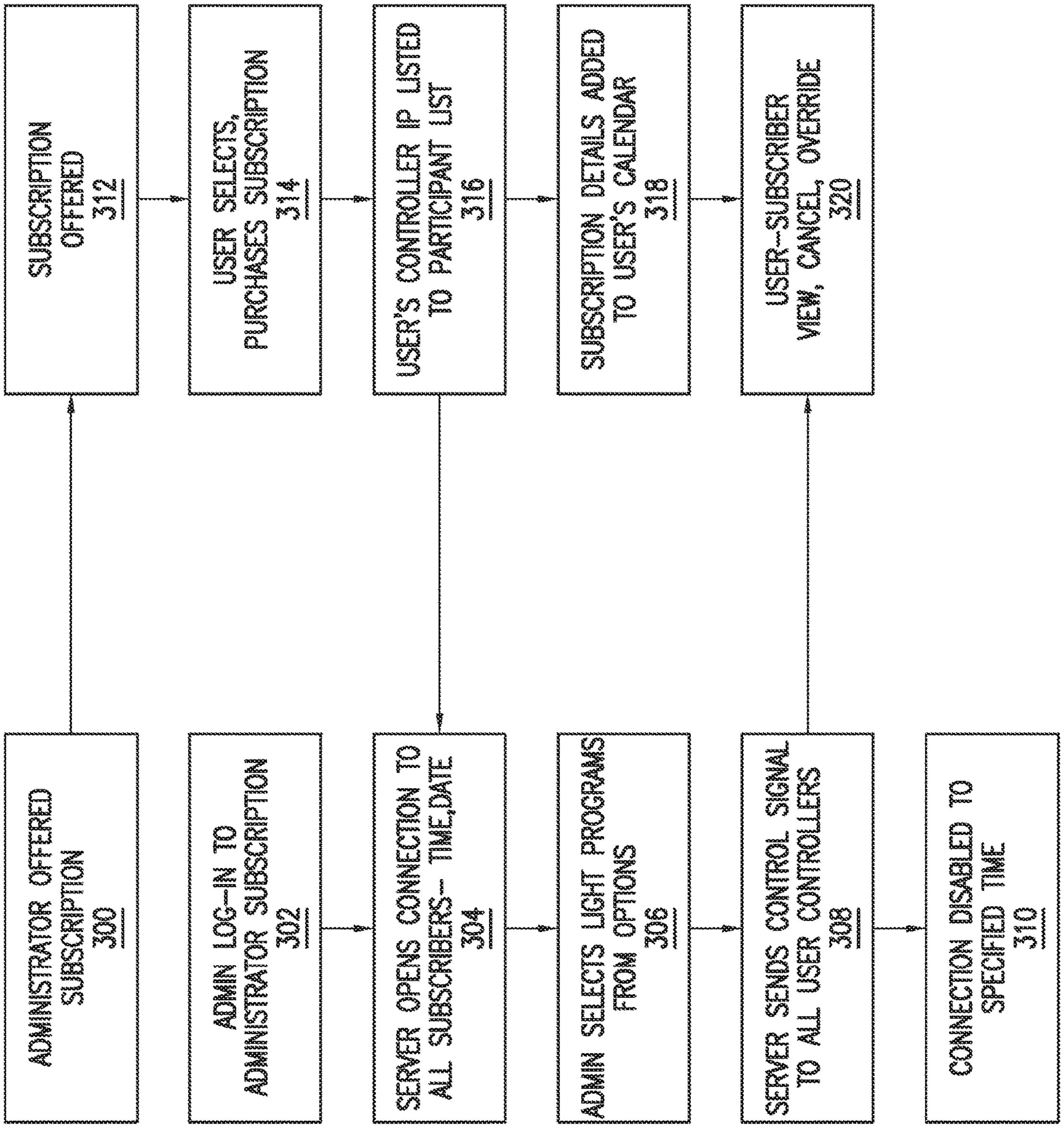
FIG. 7 is a chart listing exemplary subscription offerings provided on an exemplary content server according to an aspect of the disclosure.

FIG. 7 is a chart of subscription offerings. The chart speaks for itself. An administrator offered subscription 300 is offered at 312. A user selects or purchases the subscription at 314. A user's controller IP is then listed to a participant list at 316. Subscription details are then added to the user's calendar at 318. The user-subscriber views, cancels, or overrides additions at 320. An administrator logs-in to the administrator subscription at 302. A server opens a connection to all subscribers at 304 which occurs at a time and date. The administrator selects light programs from option at 306. The server sends control signals to all user controllers at 308. The connection is disabled to a specified time at 310.

Figure 8:
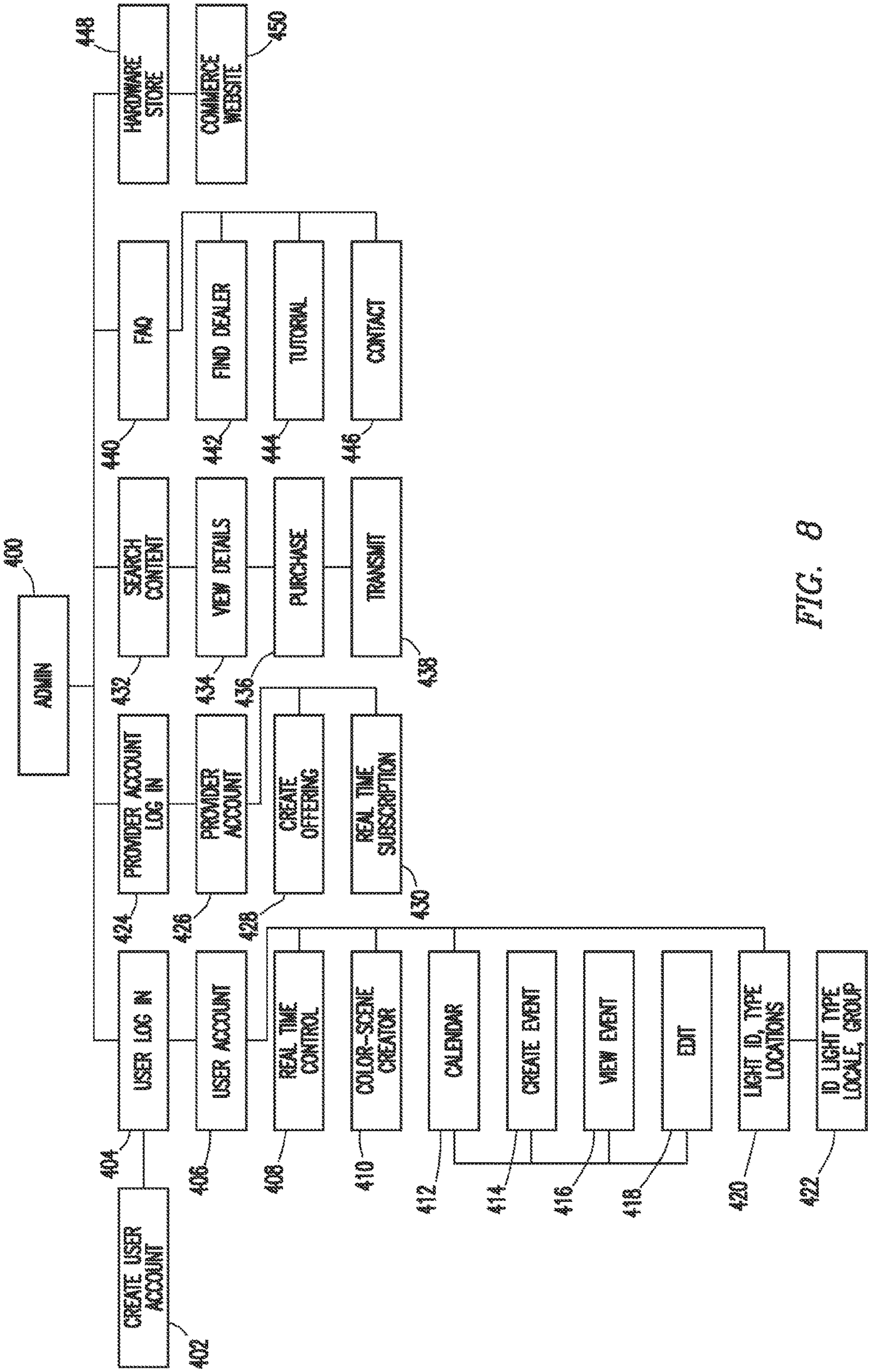
FIG. 8 is an exemplary layout of accessible information and fields on a content server according to an aspect of the disclosure.

FIG. 8 is an exemplary flow chart for a user accessing the content server. The chart speaks for itself. An administrator 400 is positioned over the items in the connected chart blocks. A user account is created at 402 and a user logs in at 404 to a user account 406. The user account 406 offers access to real time control 408, a color-scene creator 410, a calendar 412, and light identification, type, and locations 420. For the calendar 412, an event is created 414, viewed 416, and edited 418. Light identification 420 allows identification of by light type, location, and group 422. A provider account log in 424 allows access to a provider account 426 which allows the provider to create an offering 428 or a real time subscription 430. The administrator can search light control content 432, view details thereof at 434, and can purchase 436 and transmit 438 the same. Frequently Asked Questions (FAQ) is seen at block 440, from which a user can find a dealer at 442, see a tutorial 444, or make contact 446. Also seen are blocks for a hardware store 448 and commerce website 450 accessible by the administrator.

Information collected regarding any proposed provider content, and displayed to a prospective purchaser (or licensee) can include: title of subscription, detailed description, indication of purpose of the content, a selection of type of content (e.g., program, calendared control, monitored control, etc.), The content is uploaded to the content server including the description. The description can include multiple pieces of content where they are to be purchased (e.g., Christmas and Independence Day lighting). Time and date are added for starting and ending the subscription or light control. Also, the provider can indicate suggested or required lighting controllers, color-changing lights, etc., for the premises. Cost of the subscription or purchase is also provided.

The present disclosure relates to a controller and control interface to allow for the integration of colored and color changing lighting into automation and security systems and provide a remote gateway for service providers to access a home or business's colored or color changing lighting to provide a service. The disclosure is for a device connected either wirelessly or hardwired to lighting fixtures and also the internet to provide a graphical user interface to schedule real-time or calendared triggering of a home or business's lighting fixtures by the user or permitted third parties. The present disclosure provides for the integration of color changing light triggering into the Enhanced 9-1-1 system to provide another resource for Enhanced 9-1-1 to direct first responders and alert the public as to a safety or security emergency. The present disclosure in one aspect proposes a standardized code to indicate different types of emergency using colored or color-changing lighting to provide a security enhancement to direct first responders and communicate with the community. The present disclosure allows for the use of control parameters on fade and hold times for colored or color-changing lighting to avoid instances of false alarms or improper use of colored or color-changing lighting of fixtures when used with the present disclosure.

Figure 9:
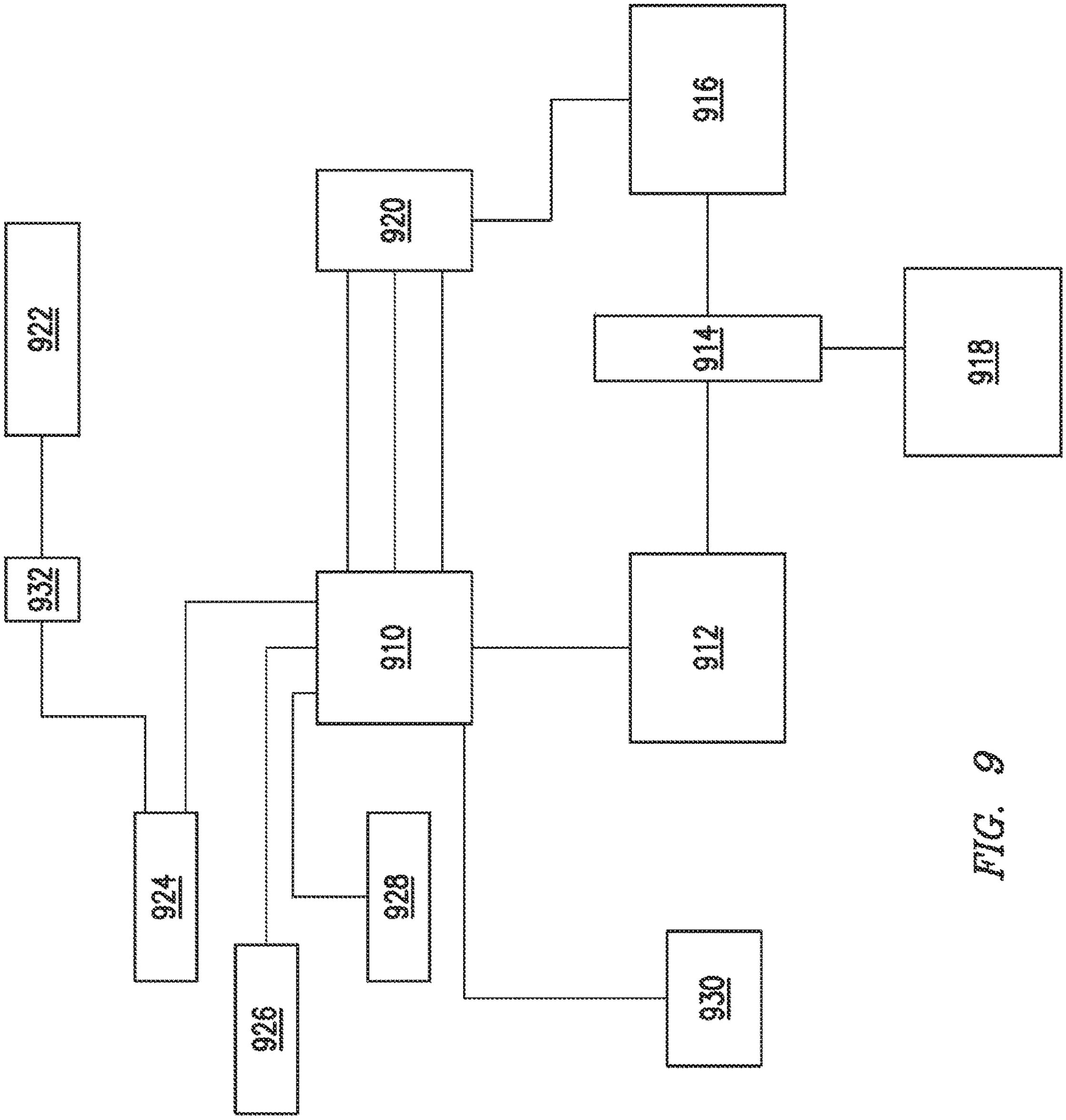
FIG. 9 is an schematic of an exemplary computerized system architecture according to an aspect of the disclosure.

Referring now to the disclosure in more detail, in FIG. 9 there as shown the control gateway 910 hardwired to an internet protocol addressable router 912 that communicates with an internet hosted user account 914. The online user account 914 provides the user the ability to subscribe to service providers 918 and Enhanced 9-1-1 916. The control gateway 910 is connected to a local security system 920. Enhanced 9-1-1 916 may also send a control signal to the local security system 920 which then sends a control signal to the control gateway 910 which then directly controls the lighting fixtures 924 926 928 using. The control gateway 910 is also connected either wirelessly or hardwired to up to hundreds of light sources 924 926 928. The control gateway can also be connected to a local control system 930 either hardwired or wirelessly on a wireless network when available. The control gateway 910 is powered by a low-voltage electrical transformer 922 with an optional battery or solar backup 932 for operation if electricity is lost.

Still referring to FIG. 9, the control gateway 910 directly controls the lighting fixtures 924 926 928 using signals sent from three possible control sources when available, an internet hosted user account 914 via an internet protocol addressable router 912, a local control system 930 and/or a local security system 920. The control gateway 910 updates to check for control information from all control sources within every second in order to achieve near-real-time control. Since the control gateway 910 can receive control information from several control sources, the control gateway 910 assigns control precedence to these signals in order to eliminate the problem of conflicting signals. Enhanced 9-1-1 916 whose control signal can either be sent to the internet hosted user account 914 through the local internet protocol addressable router 912 to the control gateway 910 to the lighting fixtures 924 926 928 or through the security system 920 which then sends the control signal to the control gateway 910 to the lighting fixtures 924 926 928 has first control priority followed by the local security system 920 followed by the local control system 930 followed by the online user account 914.

In further detail, still referring to FIG. 9, the online user account 914 provides the user the ability to register an account hosted by the present disclosure on the internet by entering the internet protocol address of the internet protocol router 912. The user will have to have at least one color-changing or colored lighting fixture 924 926 928 connected to the control gateway 910 connected to the internet protocol addressable router 912. The user will be able to register the account and identify the fixtures. The user can create color changing patterns by selecting colors and adjusting the fade and hold time for the colors and saving them as scenes. The user can then select those saved scenes and schedule specific lighting fixtures to display those scenes and schedule them on a calendar as events by selecting the date and start and stop time for the event. The user can also access subscriptions to allow access to control of specific lighting fixtures 924 926 928 by service providers 918 including Enhanced 9-1-1 916. The subscriptions indicate the timeframe(s) of access to control and a description of use.

Still referring to FIG. 9, service providers 918 can host subscriptions to offer control over color-changing lighting fixtures. Service providers 918 establish an online account hosted by the present disclosure by registering identifying information, a description of the purpose of the subscription, establishing the color-changing patterns that will be used and may also indicate a monetary cost for the service which can also be linked to a charity where all or an identified portion will be paid to that charity. The subscription is then made active where users with internet hosted user accounts 914 established as a part of the present disclosure can subscribe to the service provider 918 subscription and select the specific lighting fixtures 924 926 928 for the service provider 918 to control under the parameters set forth in the subscription. The service provider 918 is then able to control the lighting fixtures during the specified period of time using the color-changing patterns specified when the service provider 918 established the subscription.

In further detail, still referring to FIG. 9, the Enhanced 9-1-1 916 subscription as a part of this disclosure provides the service of sending control signals to the local security system 920 or through the internet hosted user account 914 through the local internet protocol addressable router 912 to the control gateway 910 to the lighting fixtures 924 926 928. Since the subscription is for security purposes, which supposes a potential for electricity loss, the most reliable control signal pathway from Enhanced 9-1-1 916 is through the security system 920 which sends the control signal to the control gateway 910 to the lighting fixtures 924 926 928. This is a more reliable pathway to triggering the lights since the security system 920, the control gateway 910 and the lighting fixtures will have a power backup in case of loss of electricity. The lighting fixtures 924 assigned for use with the Enhanced 9-1-1 916 subscription in the event of loss of electricity will should be used with a battery or solar backup 932.

In further detail, still referring to FIG. 9 the present disclosure proposes a standardized color code for colored or color-changing light on architecture in order to communicate specific types of emergencies. Red flashing or strobing for one second followed by white for one second and repeat to indicate a fire or medical emergency. Blue flashing for one second followed by white for one second and repeat for a police emergency. Red and blue flashing for one second followed by white for one second if the matter cannot be determined. Yellow flashing to communicate "duck and cover." A color code could also be used as a part of an "Amber Alert," to indicate "Evacuate." or other specific emergencies. Once the color-code is adopted in a geographical area by governing entities, the ability to trigger these codes or codes that are similar will be prohibited for use unless the case of an emergency. The present disclosure can limit the control options for the use of color-changing lighting connected to the control gateway 910 by placing control parameters on the fade and hold times for the lighting to avoid a similar lighting effect to be used.

In further detail, still referring to FIG. 9, the present disclosure requires that the lighting fixtures 924 926 928 be identified in the user interface provided for the internet hosted user account 914, the Enhanced 9-1-1 Subscription 916 and the service provider 918 using choices provided in a drop down menu. The reason for this is to establish the function of the lighting fixture 924 926 928 in order to provide the control capability to Enhanced 9-1-1 916 and the service provider 918. Color changing lights will have different abilities and uses than colored lighting. An incorrect assignment of the lighting fixture 924 926 928 type could mean lack of or incorrect functionality. Lighting placement will also be specified which effects the use of such lights in the case of theater lighting for instance.

In further detail, the present disclosure can control multiple color-changing lighting fixtures simultaneously and start and stop in coordination with unique sound identification layers present in all movies. The present disclosure allows a lighting design programmer to identify common theater lighting fixtures of all types including a backlit screen, side theater wall sconce lighting, rear forward-facing lighting among others identified in the interface offered in the present disclosure to specify the fixtures to change colors and brightness according to the events in a movie. The lighting design programmer can then offer a subscription for the programming made specifically for the intended movie through the present disclosure and sell the programming. The purchaser of the programming, given they have the same lighting fixtures as indicated in the programming in the user interface offered in the present disclosure as programmed in the subscription, could play the movie and the lights in the theater would change with the programming in the subscription.

Figure 10:
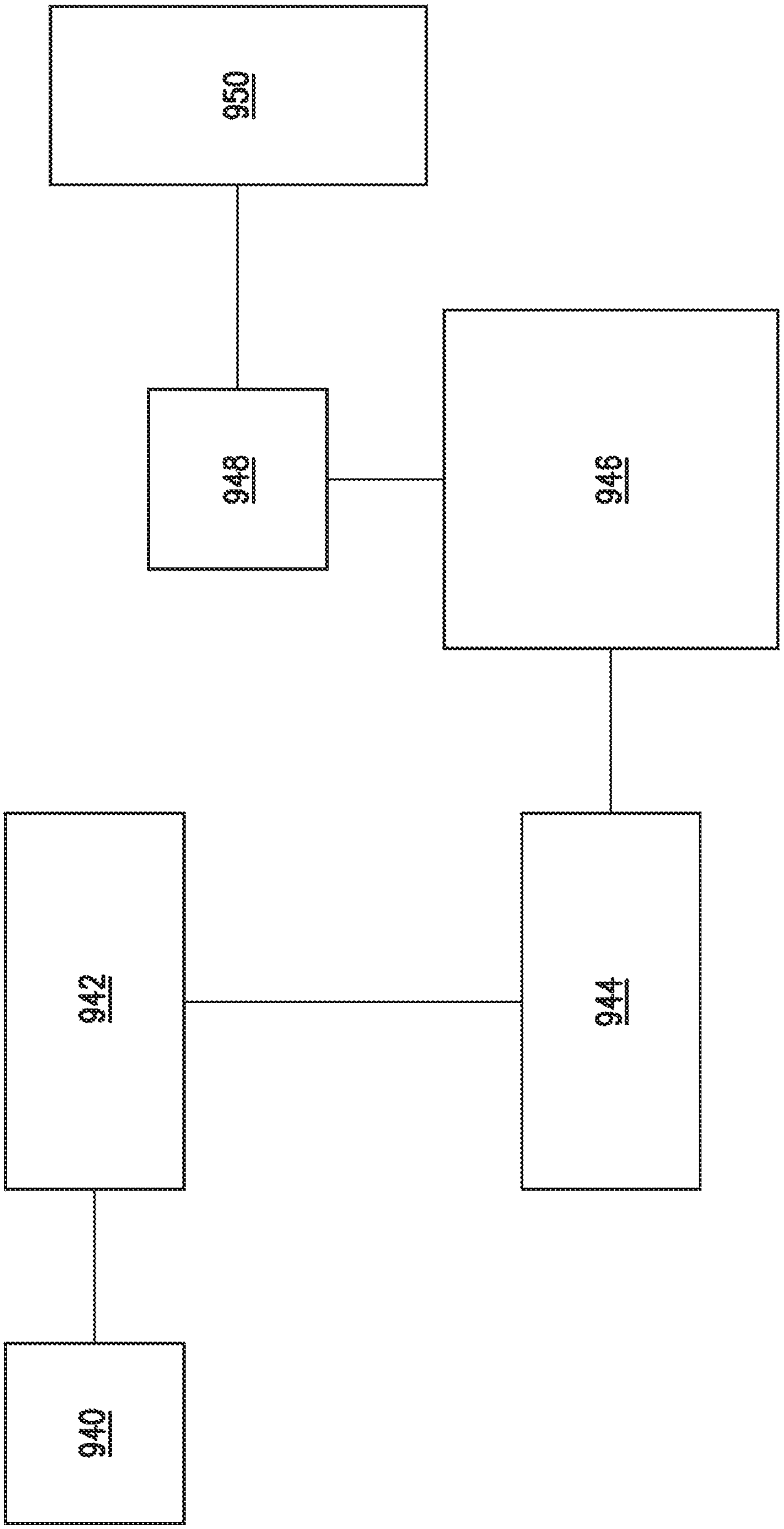
FIG. 10 is a schematic of an online user account subscribed to an Enhanced 9-1-1 Subscription according to an aspect of the disclosure.

Now referring to FIG. 10 as shown an online user account 940 subscribed to the Enhanced 9-1-1 Subscription 942 as a part of the present disclosure. The Enhanced 9-1-1 Subscription 942 will provide the subscription information to the Selective Routing Database 944 which will then communicate to the Computer Assisted Dispatch System 946 used by the local Public Safety Answering Point 948 to activate the lights as needed at the location of the call 950.

In further detail, still referring to FIG. 10, as a part of the present disclosure, the Enhanced 9-1-1 Subscription 942 provides information to the Selective Routing Database 944 to indicate to the Computer Assisted Dispatch System 946 the availability and color-code choices to indicate specific emergencies available at the location 950 in the case of an emergency. The Enhanced 9-1-1 Subscription 942 will require the following information for activation, the location address, any corresponding wireline or Voice Over Internet Protocol phone numbers located at the address, indication of the lighting fixtures controlled and the type of fixture(s) to be controlled. The present disclosure will add a query field to the graphical user interface of the Computer Assisted Dispatch System 946 to indicate to the personnel at the Public Safety Answering Point the availability of color-code options available at the address to trigger the lights to direct the appropriate first responders.

The advantages of the present disclosure include, without limitation, the ability to increase the effectiveness of a security system by using colored light to indicate the location of an emergency and the nature of the emergency with the use of a color-code. The present disclosure allows first responders to locate and respond to an emergency more effectively and quickly which makes the first responders and the community in general safer. The capability of the present disclosure allows the personnel who operate the Enhanced 9-1-1 system to activate the lights on architectural structures which provides an added assistance to the Enhanced 9-1-1 system to direct the appropriate first responders. The present disclosure provides the ability for a user to give access to service providers to access the color changing lighting in real time to offer value added services that have never been provided before such as having specified light fixtures in a theater to synch and change to the mood and action of a movie to provide an added sensitization to a viewing experience. This feature will allow lighting design programmers to sell their designs for purchase to music and movies which is not currently offered.

In broad embodiment, the present disclosure provides a gateway for the use of colored or color-changing lighting to be integrated into existing control systems including security systems to communicate specific events using a color-code and assign remote third party control as a platform for service providers to offer subscriptions for value added services.

The following disclosure is provided in support of the methods claimed or which may be later claimed. Specifically, this support is provided to meet the technical, procedural, or substantive requirements of certain examining offices. It is expressly understood that the portions or actions of the methods can be performed in any order, unless specified or otherwise necessary, that each portion of the method can be repeated, performed in orders other than those presented, that additional actions can be performed between the enumerated actions, and that, unless stated otherwise, actions can be omitted or moved. Those of skill in the art will recognize the various possible combinations and permutations of actions performable in the methods disclosed herein without an explicit listing of every possible such combination or permutation. It is explicitly disclosed and understood that the actions disclosed, both herein below and throughout, can be performed in any order (xyz, xzy, yxz, yzx, etc.) without the wasteful and tedious inclusion of writing out every such order.

The description of the various methods are provided here numbered for ease of reference. The numbering does not indicate the order or necessity of steps. However, the steps do reference lower-numbered steps to indicate that the higher-numbered steps can be performed in conjunction with the lower-numbered steps. To wit, the disclosure includes in various embodiments: 1. A method of providing lighting control content to users, the method comprising: a. connecting a content server to the internet, the content server providing lighting control content; b. connecting a remote private network located at a premises, via the internet, to the content server; and c. transmitting lighting control content from the content server to the remote private network to control a colored or color-changing light system located on the premises. 2. The method of claim 1, further comprising: d) connecting, via the internet, a remote provider network to the content server; and e) transmitting lighting control content from the remote provider network to the content server. 3. The method of claims 1-2, further comprising: f) facilitating transmission of lighting control content from the remote provider network to the remote private network. 4. The method of claims 1-3, further comprising: g) transmitting gateway software to a computer of the remote private network, the gateway software providing computer executable instructions to the computer that, when executed, connects the computer of the remote private network to the content server. 5. The method of claims 1-4, further comprising: maintaining individual user accounts on a user account server corresponding to a plurality of remote private networks. 6. The method of claim 5, further comprising: administering access by a user of a remote private network to lighting control content on the lighting control server. 7. The method of claims 1-6, further comprising: maintaining individual provider accounts, on a provider account server, corresponding to a plurality of remote provider networks. 8. The method of claim 7, further comprising: administering access of a user of a remote provider network to the lighting control server. 9. The method of claims 6-8, wherein administering access includes identifying and verifying the user of a remote [private/provider] network before allowing access to the content server. 10. The method of claims 1-9, wherein the remote private network includes a computer selected from the group consisting of: personal computers, gateway hardware devices, handheld devices, mobile devices, servers, routers, and any combination thereof. 11. The method of claims 1-10, wherein the lighting control content is selected from the group consisting of lighting control: software; streaming content; calendaring software or data; activation software or data; use-management software or data; interface or protocol software; software or data for synchronization of lighting control to a real-time event; software or data for synchronization of lighting control to specified audio or audio-visual content; software for controlling lighting in response to sensed audio, visual, or audio-visual stimuli; subscription software or data; software or data for control of security lighting; and any combination thereof. 12. The method of claim 5, further comprising: collecting individual user data corresponding to a remote private network. 13. The method of claim 12, wherein the individual user data comprises: a user name, a user password, a user IP address, a user physical address, lighting controller data, lighting fixture data, lighting location data, lighting grouping data, lighting color data, calendaring data, security system data, subscription data, or permissions for real-time lighting control by a subscription or security administrator. 14. The method of claims 1-13, wherein the colored or color-changing light system comprises: one or more color-changing light sources and a color-changing light controller. 15. The method of claim 14, wherein the color-changing light sources include at least one of: RGB LEDs, bi-color LEDs, flashing LEDs, digital RGB LEDs, and RGB white LEDs. 16. The method of claim 14, wherein the color-changing light controller comprises hardware and software located on the premises to control: light intensity, light color, color-change sequence, color-change transition effects, color-change duration or speed, on/off, and/or flashing or strobe effects. 17. The method of claim of 14, wherein the lighting control content transmitted from the content server to the remote private network, upon execution, controls a color-changing light controller located on the premises. 18. The method of claim 14, wherein the color-changing light controller controls the color-changing light sources remotely. 19. The method of claims 6-18, wherein administering access by a user of a remote private network further comprises collecting, storing, and associating user data with the user's user account. 20. The method of claim 19, wherein the user data is selected from the group consisting of: selection of lighting control content; selection of subscription services for lighting control content; selection of authorized administrators having access to the user's private network; selection of times authorized administrators have access to the user's private network; selection of events when lighting control is desired (e.g., weather service warnings); calendaring of events when lighting control is desired (e.g., game days); calendaring and indication of times when the user is absent or present on the premises; identification and information relating to the user's color-changing lighting system; identification of the number, type, specifications, and location of lighting sources installed at the user's premises; designation of light sources or locations for a specific purpose (e.g., theater lighting); and any combination thereof. 21. The method of claim 20, further comprising connecting to the remote private network and controlling the color-changing light system in response to occurrence of: a selected event, a calendared event, an event related to a selected subscription, or an event identified by a subscription provider. 22. The method of claim 21, further comprising controlling the color-changing system in real time in response to real time events (e.g., weather warning, touchdown). 23. The method of claim 20, further comprising transmitting color lighting content to the remote private network executable to control the color-changing light system upon occurrence of an event (e.g., alarm, start of movie), or calendared event. 24. The method of claims 1-23, further comprising: administering transmission of lighting control content from a remote provider network to a remote private network, including identifying and verifying the remote provider network and the remote private network, and transmitting data regarding the verification to at least one of the remote provider network and remote private network.

Similarly, the disclosure includes methods as follows: 25. A method of controlling emergency color-changing lights on a premises, the method comprising: connecting a premises network and a monitoring service network, via the internet, the premises network having an electronic, monitored security system, a color-changing light controller, at least one color-changing light, a color-changing light gateway, and an internet router, and the monitoring service network having a server; connecting the monitoring service network and a color-changing light content administrator network having a server, via the internet; transmitting subscription data between the monitoring service network and the color-changing light content administrator; and controlling the color-changing light controller of the premises network by transmitting data between the monitoring service network and the premises network. 26. The method of claim 25, further comprising connecting and transmitting data between the premises network and an Enhanced 9-1-1 network having at least a server. 27. The method of claims 25-26, further comprising controlling the color-changing light controller by transmitting data between the Enhanced 9-1-1 network and the premises network. 28. The method of claims 25 to 27, further comprising controlling the color-changing light controller of the premises network by transmitting data between the color-changing light content administrator network and the premises network. 29. The method of claims 25-28, wherein transmitting subscription data between the monitoring service network and the color-changing light content administrator further comprises: transmitting a database of color-changing light content subscribers or a database of monitoring service subscribers, comparing the databases, and verifying a subscriber is on both databases. 30. The method of claims 25-29, transmitting subscription data between the monitoring service network and the color-changing light content administrator further comprises: transmitting data regarding the security system, color-changing light controller, color-changing light, color-changing light gateway, and the internet router of the premises network. 31. The method of claims 25-30, wherein the security system and gateway are connected and communicate to each other. 32. The method of claims 25-31, further comprising transmitting an Application Programming Interface (API) between the color-changing light content administrator network and the monitoring service network. 33. The method of claims 25-32, further comprising transmitting data between the premises network and the monitoring service network or color-changing light content administrator network. 34. The method of claims 25-33, wherein the internet router of the premises network is directly connected to one or both of the monitored security system and gateway. 35. The method of claims 25-34, wherein the monitored security system includes software and hardware located on the premises, and wherein the monitored security system interfaces directly with or incorporates the color-changing light controller.

U.S. Provisional Application No. 61/780,064, filed Mar. 13, 2013, is incorporated herein by reference for all purposes. For further disclosure regarding controlling color-changing lights synchronously with audio-visual events (e.g., movies), see EP 2,605,622 A3, Dynamic Ambient Lighting, to Comcast Cable Communications, LLC; for further disclosure relating to subscription based service and content models, controlling and distributing content, etc., see, for example, U.S. Pat. No. 8,520,068, to Naidoo, et al.; for further disclosure related to color-changing light control in response to sensed parameters and content therefor, see U.S. Pub. Pat. App. 2011/0215725, to Paolini; for further disclosure related to monitored subscription services, calendar loading and synchronizing, and multi-tenant architecture, see U.S. Pat. No. 8,438,210, to Poder, et al.; each of which are hereby incorporated by reference for all purposes.

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

As used herein, the words "consisting essentially of," and all grammatical variations thereof are intended to limit the scope of a claim to the specified materials or steps and those that do not materially affect the basic and novel characteristic(s) of the claimed disclosure.

The indefinite articles "a" or "an" mean one or more than one of the component, part, or step that the article introduces. The terms "and," "or," and "and/or" shall be read in the least restrictive sense possible. Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

While the foregoing written description of the disclosure enables one of ordinary skill to make and use the embodiments discussed, those of ordinary skill will understand and appreciate the existence of variations, combinations, and equivalents of the specific embodiments, methods, and examples herein. The invention should therefore not be limited by the above described embodiments, methods, and examples. While this disclosure has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments. The particular embodiments disclosed above are illustrative only, as the present disclosure may be modified and practiced in different but equivalent manners apparent to those skilled in the art having the benefit of the teachings herein.

It is, therefore, evident that the particular illustrative embodiments disclosed above may be altered or modified and all such variations are considered within the scope of the present disclosure. The various elements or steps according to the disclosed elements or steps can be combined advantageously or practiced together in various combinations or sub-combinations of elements or sequences of steps to increase the efficiency and benefits that can be obtained from the disclosure. It will be appreciated that one or more of the above embodiments may be combined with one or more of the other embodiments, unless explicitly stated otherwise. The disclosure illustratively disclosed herein suitably may be practiced in the absence of any element or step that is not specifically disclosed or claimed. Furthermore, no limitations are intended to the details of construction, composition, design, or steps herein shown, other than as described in the claims.

It is claimed:

1. A method of controlling the general purpose color-changing lights on a premises, the method comprising:

in a premises network connected to a service network, via the internet, the premises network having an electronic security system, a color-changing light controller, a plurality of general purpose color-changing lights controlled by the light controller and positioned throughout the premises and used as non-emergency, general purpose light sources providing illumination in rooms of the premises, a color-changing light gateway, and an internet router;

connecting the premises network, via the internet, to the service network, the service network having a server;

transmitting color-changing light control data between the service network, and the premises network; and using the color-changing light control data:

controlling the general purpose lights to emit a controlled lighting code via the color-changing light controller of the premises network by changing the color of light emitted from the general purpose lights from an initial color to a pattern of alternating colored light and white light, and communicating by the controlled lighting code an emergency condition of fire by alternating red and white light and an emergency condition requiring police by alternating blue and white light; and placing control parameters limiting the control options available to a user for selective operation of the color-changing lights of the premises to prevent use of the controlled lighting code for non-emergency purposes.

2. The method of claim 1, wherein transmitting data between the service network and the premises network further comprises: transmitting data from a database of color-changing light content subscribers and a database of service subscribers, comparing the databases, and verifying a subscriber is on one or both databases.

3. The method of claim 2, transmitting data between the service network and the premises network further comprises: transmitting data regarding the security system, color-changing light controller, the plurality of color-changing lights, color-changing light gateway, or the internet router of the premises network.

4. The method of claim 1, wherein the security system and gateway are connected and communicate to each other.

5. The method of claim 1, further comprising transmitting an Application Programming Interface (API) between the premises network and the service network.

6. The method of claim 1, wherein the internet router of the premises network is directly connected to one or both of the security system and gateway.

7. The method of claim 1, wherein the security system includes software and hardware located on the premises, and wherein the security system interfaces directly with or incorporates the color-changing light controller.

8. The method of claim 1, wherein the controlled lighting code pattern of alternating colored light and white light further comprises alternatingly emitting from the group of emergency lights: red light and white light for the emergency condition of fire; blue light and white light for the emergency condition of police; and yellow and white light for the emergency condition of a weather or medical situation.

9. The method of claim 8, wherein the alternating colored light and white light are each on for a designated period of time.

10. The method of claim 1, further comprising connecting the service network to the premises network and controlling the color-changing lights in real time via the service network in response to a real time event.

11. The method of claim 10, wherein the real time event is a weather warning.

12. The method of claim 1, wherein the service network is a monitoring service network or an administrator network.

13. A method of controlling general-purpose, color-changing lighting on a premises, the method comprising:

for general-purpose lighting on the premises, the lighting used for illumination of rooms in the premises, the lighting emitting an original color of light;

controlling the color-changing lighting in response to an emergency condition to emit a color-coded signal consisting of changing the emitted light alternatingly between red and white in a repeated sequence, wherein the red color indicates a fire emergency condition; and controlling the color-changing lighting in response to an emergency condition to emit a color-coded signal consisting of changing the emitted light alternatingly between blue and white in a repeated sequence, wherein the blue color indicates a police emergency condition; and placing control parameters limiting the control of the color-changing lighting available to a user to prevent use of the color-coded signals for non-emergency purposes.

14. The method of claim 13, further comprising controlling the color-changing lighting in response to an emergency condition to emit a color-coded signal consisting of changing the emitted light alternatingly between yellow and white in a repeated sequence, wherein the yellow color indicates a non-fire and non-police emergency condition.

15. The method of claim 13, wherein the color-coded signal consists of flashing or strobing of the non-white color for a time period followed by emitting white light for a time period.

16. The method of claim 13, wherein the color-changing lighting is controlled by a color-changing light controller, and wherein placing control parameters limiting control of the color-changing lighting available to a user further comprises applying control parameters to the color-changing light controller.

17. The method of claim 16, further comprising applying control parameters via an Application Program Interface (API).

18. The method of claim 16, wherein the color-changing lighting is controlled by a color-changing light controller, and wherein placing control parameters limiting control of the color-changing lighting available to a user further comprises applying control parameters from a remote network or content server.

19. The method of claim 16, wherein placing control parameters limiting control of the color-changing lighting available to a user further comprises placing control parameters on fade and hold times of the color-changing lighting.

20. The method of claim 16, further comprising controlling the color-changing lights in real time via a connected service network.

21. A method of controlling general-purpose, color-changing lighting on a premises, the method comprising:

for general-purpose lighting on the premises, the lighting used for illumination of rooms in the premises, the lighting emitting an original color of light;

controlling the color-changing lighting in response to an emergency condition to emit a color-coded emergency signal consisting of changing the emitted light alternatingly between a non-white color and white in a repeated sequence, wherein the non-white color indicates a type of emergency condition; and placing control parameters limiting the control of the color-changing lighting available to a user to prevent use of the color-coded signals for non-emergency purposes.

22. The method of claim 21, wherein the color-changing lighting is controlled by a color-changing light controller, and wherein placing control parameters limiting control of the color-changing lighting available to a user further comprises applying control parameters to the color-changing light controller.

23. The method of claim 22, further comprising applying control parameters via an Application Program Interface (API).

24. The method of claim 22, wherein the color-changing lighting is controlled by a color-changing light controller, and wherein placing control parameters limiting control of the color-changing lighting available to a user further comprises applying control parameters at a remote network or content server.

25. The method of claim 16, further comprising controlling the color-changing lights in real time via a connected service network.

* * * * *